(12) United States Patent
Desai et al.

(10) Patent No.: US 7,852,199 B2
(45) Date of Patent: Dec. 14, 2010

(54) SECURITY CONFIGURATION WITH AN INDUCTIVELY COUPLED TOUCH SENSITIVE KEYPAD IN OR ON A WINDOW PANE AND MOTOR VEHICLE WITH THE SECURITY CONFIGURATION

(75) Inventors: Tejas Bhupendra Desai, Troy, MI (US); Thomas Klement, Regensburg (DE); Norbert Müller, Bernhardswald (DE)

(73) Assignee: Siemens Aktiengesellschaft, Munich (DE)

( * ) Notice: Subject to any disclaimer, the term of this patent is extended or adjusted under 35 U.S.C. 154(b) by 882 days.

(21) Appl. No.: 11/803,626

(22) Filed: May 15, 2007

(65) Prior Publication Data

US 2007/0276550 A1  Nov. 29, 2007

(30) Foreign Application Priority Data

May 15, 2006  (DE) ................. 10 2006 022 610

(51) Int. Cl.
*B60R 25/10* (2006.01)
(52) U.S. Cl. .................. 340/426.1; 340/5.72; 341/22; 345/173
(58) Field of Classification Search ............ 340/426.1, 340/5.72, 5.7, 601, 602; 341/32, 33; 257/531, 257/532; 345/173
See application file for complete search history.

(56) References Cited

U.S. PATENT DOCUMENTS

| 5,441,416 | A | 8/1995 | Gajewski et al. |
| 5,467,080 | A | 11/1995 | Stoll et al. |
| 5,783,994 | A | 7/1998 | Koopman, Jr. et al. |
| 5,952,731 | A | 9/1999 | McPherson et al. |
| 6,794,728 | B1 * | 9/2004 | Kithil .................. 257/532 |
| 2003/0071708 | A1 * | 4/2003 | Schmidt ............... 336/220 |
| 2004/0246098 | A1 | 12/2004 | Denison et al. |
| 2006/0238385 | A1 * | 10/2006 | Steenwyk et al. ......... 341/33 |

FOREIGN PATENT DOCUMENTS

| DE | 693 31 084 T2 | 7/2002 |
| DE | 203 00 984 U1 | 8/2004 |
| WO | WO 98/45147 | 10/1998 |
| WO | WO 99/58795 | 11/1999 |

* cited by examiner

*Primary Examiner*—Jeffery Hofsass
(74) *Attorney, Agent, or Firm*—Laurence A. Greenberg; Werner H. Stemer; Ralph E. Locher

(57) ABSTRACT

A security configuration in or for a motor vehicle, which includes a bodywork part, such as a door, and a window pane arranged in the bodywork part. The security configuration includes a touch-sensitive keypad integrated in or mounted to the window pane. The keypad has a plurality of touch sensors, each of which takes the form of resonant oscillating circuits and via which an actuation of a respective touch sensor can be picked up. An electronic evaluation system is configured for the purpose of detecting an actuation of the keypad and attributing said actuation to a respectively actuated touch sensor. There is also provided a motor vehicle which includes such a security configuration.

20 Claims, 5 Drawing Sheets

SECURITY CONFIGURATION WITH AN INDUCTIVELY COUPLED TOUCH SENSITIVE KEYPAD IN OR ON A WINDOW PANE AND MOTOR VEHICLE WITH THE SECURITY CONFIGURATION

CROSS-REFERENCE TO RELATED APPLICATION

This application claims the priority, under 35 U.S.C. §119, of German application DE 10 2006 022 610.0, filed May 15, 2006; the prior application is herewith incorporated by reference in its entirety.

BACKGROUND OF THE INVENTION

Field of the Invention

The invention relates to a security configuration in or for a vehicle, and to a motor vehicle with a security system.

Such security configurations in a motor vehicle are, for example, part of a theft prevention system. Modern electronic theft prevention systems in motor vehicles comprise an access authorization system, e.g. central locking, and an ignition authorization system, e.g. an immobilizer and alarm facility.

In the simple case, such an access and authorization system consists of one or more mechanical locks and associated keys by means of which the doors of the motor vehicle can be opened centrally, for example. Access authorization systems used today in motor vehicles often feature an infrared or radio-based remote control. Modern access authorization systems in motor vehicles also make use of electronic security systems, e.g. based on transponder technology, wherein cryptographically protected data communication takes place between a transceiver arranged in the motor vehicle and a transponder arranged in a key, for example, before the motor vehicle is opened.

Which of these access authorization systems is installed in a motor vehicle very often depends on the relevant requirements of the country for which the respective motor vehicles are destined, and the requirements placed on the security system by the user. In addition to the above-described possibilities for using a mechanical or electronic key in order to access a motor vehicle, other possibilities also exist.

For example, some access authorization systems in motor vehicles include a keyboard or entry pad that is connected to the locking system. The keyboard can be used to enter a code or a sequence of numbers which, following authentication, locks or unlocks the locking system of the motor vehicle. Such a keyboard for entering an access code can be arranged e.g. in the region of the door to be opened, e.g. near to the door handle or within the frame of the B-pillar. In this case, the keypad consists of mechanical or electronic keys which are provided in a keyboard that is embedded in the bodywork.

In addition to this variant, which is not generally preferred for aesthetic and manufacturing reasons, it is also possible to arrange the keypad for entering an access code in the window pane of the door which is to be opened. Such access authorization systems are described in U.S. Pat. No. 5,441,416 and in international patent application WO 99/58795. The keyboards described therein feature touch-sensitive keys, which take the form of piezoelectric switches in the case of U.S. Pat. No. 5,441,416 and vibration-sensitive sensors in the case of WO 99/58795. In both cases, the keypad is mounted on the window pane by means of an adhesive. Because they are mounted on the window pane, a disadvantage is that these keypads can be detached again as a result of improper use, and a keyless access authorization request using the keypad is no longer possible in this case. A further problem exists in that the keypad to a greater or lesser extent occupies a large area within the window pane, wherein this is not particularly advantageous for reasons of design and, in particular, it also restricts the view of the driver of the motor vehicle.

BRIEF SUMMARY OF THE INVENTION

It is accordingly an object of the invention to provide a security configuration in or for a motor vehicle and a motor vehicle, which overcome the above-mentioned disadvantages of the heretofore-known devices and methods of this general type and which better and more secure access authorization is provided and which is improved with respect to aesthetic considerations for a vehicle.

With the foregoing and other objects in view there is provided, in accordance with the invention, a security configuration in or for a vehicle having a bodywork part and a window pane disposed in the bodywork part, the security configuration comprising:
    a touch-sensitive keypad disposed in or mounted on the window pane, the keypad including a plurality of touch sensors each in the form of a resonant oscillating circuit and capable of acquiring an actuation of a respective the touch sensor; and
    an electronic evaluation system configured and disposed to detect an actuation of the keypad and to attribute each actuation to a respectively actuated the touch sensor.

In other words, the objects of the invention are achieved, in accordance with the invention, by a security configuration in or for a vehicle, including a bodywork part and a window pane arranged in the bodywork part, including a touch-sensitive keypad that is arranged in the window pane or applied onto the window pane and features a multiplicity of touch sensors, each of which takes the form of resonant oscillating circuits and via which a confirmation of a respective touch sensor can be picked up, including an electronic evaluation system which is configured for the purpose of detecting an actuation of the keypad and attributing the actuation to a respective actuated touch sensor.

There is also provided, in accordance with the invention, a motor vehicle which features at least one security configuration according to the invention.

The invention includes a keypad which is arranged in the region of the window pane and features a multiplicity of touch-sensitive keys. The idea of the present invention is that of producing the individual touch-sensitive keys of the keypad as resonant oscillating circuits, and inductively coupling these keys having the form of resonant oscillating circuits to an electronic evaluation system which is provided specifically for this. The individual keys having the form of resonant oscillating circuits can be produced very easily by means of a conductive coil which is arranged in the pane. These coil-form keys possess the electrical properties of a resonator, whose resonance frequency shifts when these keys are actuated, e.g. by a finger. The shift in the resonance frequency arises from the fact that e.g. a finger which actuates the key typically has a certain humidity or water content that causes the capacitive element of the resonant oscillating circuits to change its capacity, thereby ultimately resulting in a shift in the resonance frequency. In order to evaluate this shift in the resonance frequency, a further coil which is inductively coupled to the resonant oscillating circuit is provided in the vicinity of the key and can therefore detect and evaluate the change in the resonance frequency.

The particular advantage of the present invention is that the resonant oscillating circuit can be realized very easily by means of a simple coil, e.g. a flat spiral coil, which is already generally preferred for cost reasons alone. Furthermore, the arrangement of a key coil in the window pane is also elegant and aesthetically attractive, since it does not require the provision of too large a space. Moreover, the keypad which is thus equipped with coils also offers a very significant advantage in terms of a consequently less restricted view in comparison with the keypads cited in the introduction which are arranged on the window pane.

Advantageous embodiments and developments of the invention are derived from the further subclaims and from the description in conjunction with the drawings.

In a particularly preferred embodiment, the electronic evaluation system is coupled inductively, i.e. via a magnetic strapping, to the keypad and hence in particular to the individual touch sensors having the form of resonant oscillating circuits. Consequently, the electronic evaluation system does not require an electronic connection to the pane for the purpose of detecting and evaluating the actuations of the individual keys which are picked up there by the touch sensors. The electronic evaluation system can therefore be installed in the interior of the bodywork, e.g. within the vehicle door, and thus be protected in particular against damage and tampering.

A preferred embodiment of the invention provides for a relevant touch sensor of the keypad to include an inductive part which is inductively coupled to an inductive pick-up of the electronic evaluation system, the pick-up being assigned to this touch sensor in each case.

In a preferred embodiment, the resonant oscillating circuit takes the form of a coil with an open end. Additionally or alternatively, the resonant oscillating circuit can also take the form of a coil with closed ends. In order to achieve an inductive coupling of the resonant oscillating circuit to the electronic evaluation system, the coil of the resonant oscillating circuit features a winding which is drawn out. The drawn-out winding serves as a magnetic coupling element, via which the resonant oscillating circuit can be coupled to the electronic evaluation system.

In a preferred embodiment of the invention, the keypad is arranged at least partially in a region of the window pane which is visible from the exterior. In this case, the keypad is preferably arranged in a region of the window pane which is immediately adjacent to a part of the bodywork, since the electronic evaluation system is typically also placed in this part of the bodywork. In the case of a bodywork part which has the form of a door, the keypad is preferably arranged in the lower region of the window pane, since the corresponding electronic evaluation system can then be placed in the region of the door paneling. That region of the touch sensors which is inductively coupled to the electronic evaluation system is preferably arranged in the region of the window pane which is not visible from the exterior and is hidden by e.g. the bodywork. This results in a very good inductive coupling of the touch sensor with the electronic evaluation system which is arranged permanently in the bodywork and therefore in the region of the window pane which is not visible.

In a particularly preferred embodiment, the touch sensors are integrated within the material of the window pane. In this case, the touch sensors are therefore completely enveloped by the material of the window pane, e.g. by the window pane glass. The advantage over mechanical touch sensors or keypads which are attached externally on the window pane is that, in the case of upward and downward movement of the window pane, no wear of the individual touch sensors is caused by mechanical stress and therefore high reliability and extended service life are guaranteed. In addition, it is virtually impossible to tamper with the touch sensors in this case. To some extent, therefore, the window pane offers an external protection for the individual touch sensors.

In an alternative embodiment of the invention, the individual touch sensors are applied on a surface of the window pane. In this case, the surface is preferably that surface of the window pane which is oriented towards the interior of the vehicle (i.e. the passenger compartment). As a result of this, the keys are likewise protected against external stress, e.g. from attempts at tampering and weather conditions.

In a typical embodiment, the bodywork part takes the form of a vehicle door. The window pane is produced such that it can be at least partially retracted into the bodywork part. In this case, the keypad is preferably arranged in the lower region of the window pane and immediately adjacent to an opening in the bodywork into which the window pane can be retracted. The electronic evaluation system can then be placed in the region of this opening.

In a typical embodiment, the electronic evaluation system is arranged within the bodywork part. The electronic evaluation system is preferably arranged at a fixed position within the bodywork part. However, it would also be conceivable for the electronic evaluation system likewise to be arranged on the window pane or—like the touch sensors—integrated within the window pane.

In a typical embodiment, the electronic evaluation system has a program-controlled unit for evaluation. This program-controlled unit can take the form of a microcontroller or microprocessor, for example, but it would also be conceivable for the electronic evaluation system to be embodied as a PLD circuit or an FPGA circuit. The program-controlled unit can be part of a control device of the security configuration, for example.

In a preferred embodiment of the invention, the touch sensor features a variable capacitive part and an inductive part, these being arranged e.g. in parallel with each other.

At least one of the touch sensors preferably contains a spiral coil and, in particular, a plane spiral coil.

A particularly preferred development of the inventive motor vehicle provides for the bodywork part to take the form of a driver-side vehicle door. Additionally or alternatively, it would also be conceivable to arrange a corresponding keypad at the other doors or also at the tailgate of the motor vehicle, although the provision of a single keypad in the region of the vehicle door of the vehicle driver is preferred for reasons of cost.

The security configuration here is, by way of example, part of an access authorization system or an ignition authorization system. Such an access authorization system can be e.g. a so-called PASE system (PASE=passive access start and entry) as developed and marketed by the company Siemens VDO Automotive.

A likewise particularly preferred development of the inventive motor vehicle provides for the window pane to be the front windshield pane and/or rear window pane of the vehicle. In this case, the motor vehicle features a rain sensor unit for detecting rain falling onto the windshield pane and/or the rear window pane. The rain sensor unit here is part of the security configuration. The electronic evaluation system preferably controls a wiper speed of at least one windshield wiper of the motor vehicle, depending on the rain detected by the rain sensor unit.

Other features which are considered as characteristic for the invention are set forth in the appended claims.

Although the invention is illustrated and described herein as embodied in security configuration in or for a vehicle and motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE INVENTION

In all of the figures of the drawing, identical and functionally equivalent elements and features—unless otherwise specified—are identified with the same reference numerals.

Figure 1:
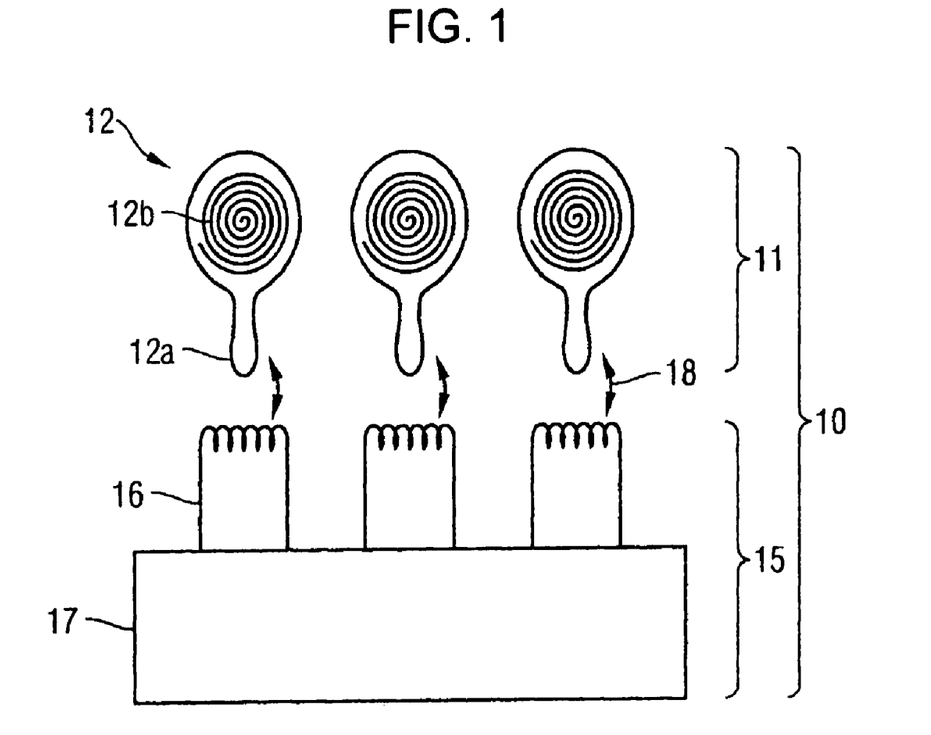
FIG. 1 is a schematic representation of a security configuration including a plurality of touch sensors according to the invention.

Referring now to the figures of the drawing in detail and first, particularly, to FIG. 1 thereof, there is shown a schematic representation of an inventive security configuration, generally designated with the reference numeral 10. The security configuration 10 features a keypad 11 with three touch sensors 12 in the present exemplary embodiment. The touch sensors 12 are touch-sensitive keypads whose structure and functionality are described in greater detail below in FIGS. 2-7.

Figure 2:
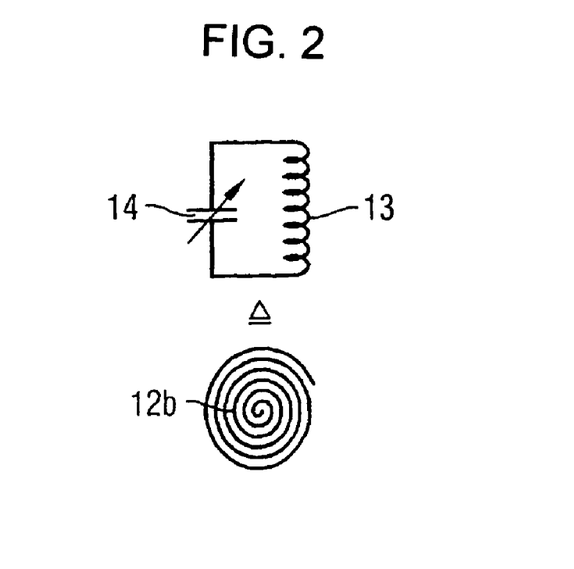
FIG. 2 shows an equivalent circuit diagram of a touch sensor having the form of a coil.

As shown in the equivalent circuit diagram in FIG. 2, a touch sensor 12 functions as a resonant oscillating circuit which includes an inductive part 13 and an adjustable capacitive part 14, these parts being arranged in parallel with each other. A relevant touch sensor 12 additionally has at least one coil region 12a which is drawn out from the touch sensor 12 and is used for the inductive coupling. The remaining part 12b of the touch sensor 12 is spirally formed. The parts 12a, 12b of the touch sensor 12 are not connected together in the example in FIG. 1.

The security configuration 10 also features an electronic evaluation system 15. The electronic evaluation system 15 features a number of coil elements 16 corresponding to the number of touch sensors 12, each of these coil elements 16 being assigned to a respective touch sensor 12. The electronic evaluation system 15 also features a control device 17 which is connected to each of these coil elements 16 via connection lines.

Figure 3:
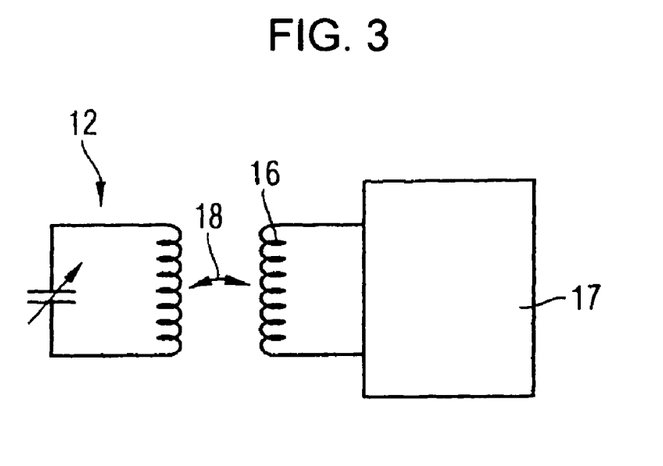
FIG. 3 shows an equivalent circuit diagram for a security configuration according to the invention.

The individual coil elements 16 are magnetically coupled to the drawn-out part 12a of a touch sensor 12 which is assigned to this coil element 16 in each case. A touch signal which is picked up by the touch sensor 12 is read off via this magnetic i.e. inductive coupling 18 of the coil elements 16 and the part 12a, wherein said touch signal can subsequently be evaluated in the control device 17. A corresponding equivalent circuit diagram for illustrating the inductive coupling 18 between the touch sensor 12 and the corresponding electronic evaluation system 15 is illustrated in FIG. 3.

Figure 4:
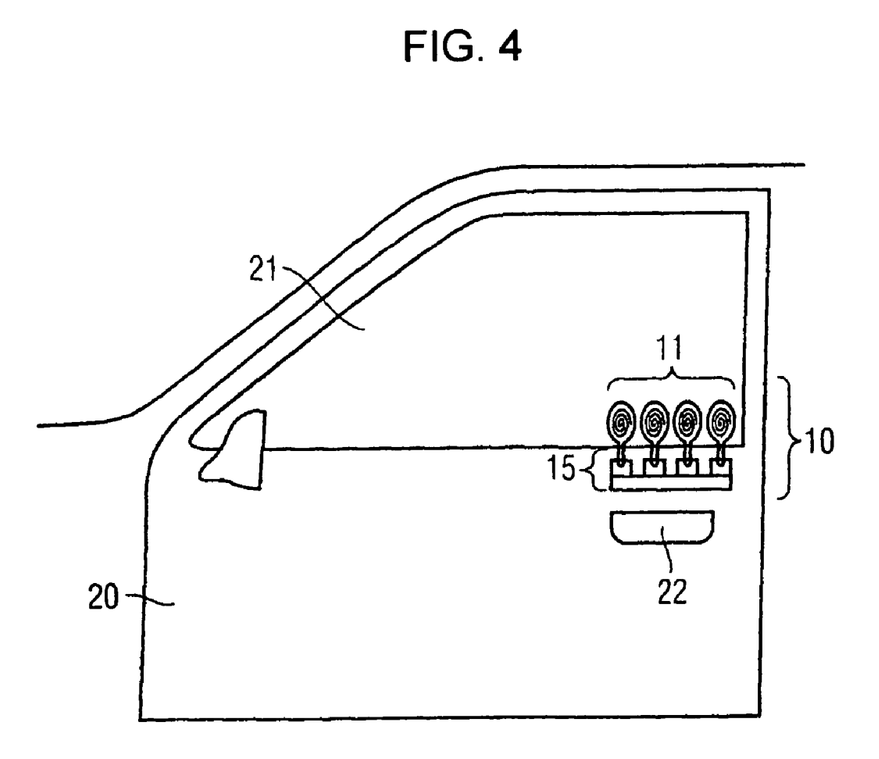
FIG. 4 shows a security configuration according to the invention arranged in a door of a motor vehicle.

Using a schematic representation, FIG. 4 shows the structure of an inventive security configuration which is arranged in a door. A section of a motor vehicle in the region of the driver-side door is illustrated in FIG. 4. The door of the motor vehicle, which is only partially represented here, is designated by the reference number 20. The door 20 includes a window pane 21 in the upper region as is customary. The window pane 21 is at least partially transparent. Provision is also made for a door handle 22. A keypad 11 and an electronic evaluation system 15 which is inductively coupled to the keypad 11, as illustrated in FIG. 1, are provided above the door handle 22. The keypad 11 includes four touch sensors 12 in this exemplary embodiment. The touch sensors 12 or the corresponding keypad 11 are arranged in the window pane 21, while the electronic evaluation system 15 is built into the bodywork of the door 20 above the door handle 22.

Figure 5:
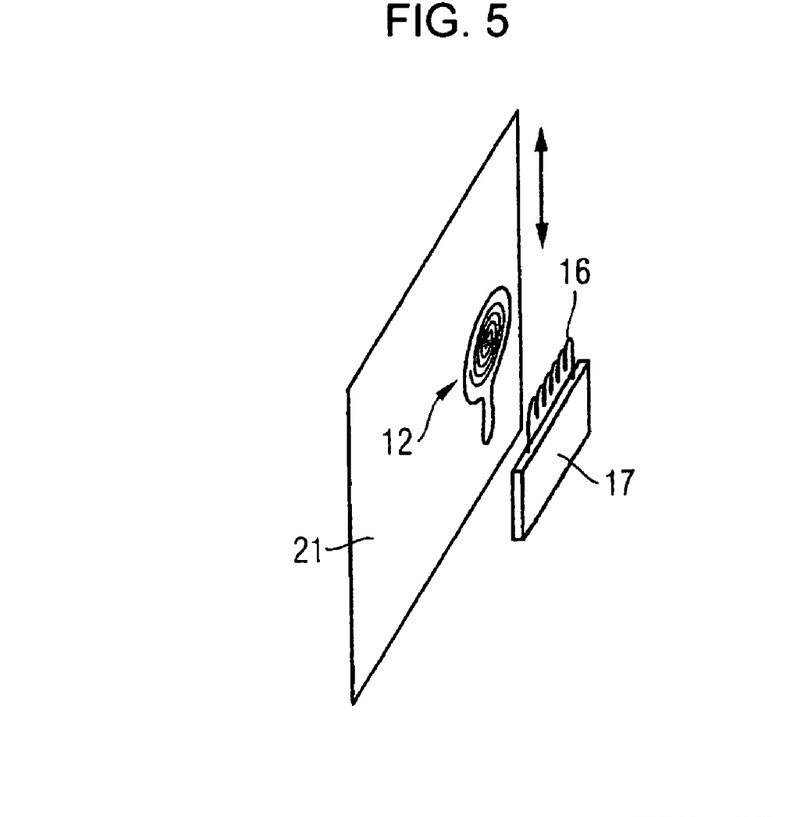
FIG. 5 shows a schematic illustration for clarifying the principle of the security configuration according to the invention.

By way of example, FIG. 5 shows the arrangement of an individual touch sensor 12 in the window pane 21 and the corresponding coil element 16 in the region of the door bodywork. It is clear that the touch sensor 12 is separate from the corresponding coil element 16 of the electronic evaluation system 15 and that these are merely coupled inductively, i.e. magnetically. The inductive coupling 18 is produced as a result of the at least partial inductive coupling connection 18 (see FIG. 3) between the part 12a and the coil element 16 of the electronic evaluation system 15, whereby an evaluation of a confirmation that is sensed by the touch sensor 12 is possible.

Figure 6A:
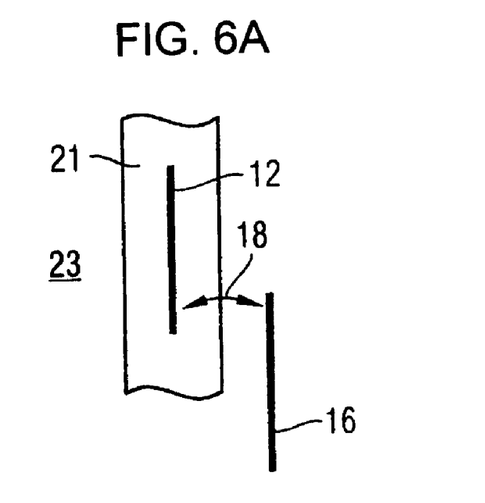
FIGS. 6A and 6B show possible installation locations for the coil of a touch sensor within or on the window pane.
Figure 6B:
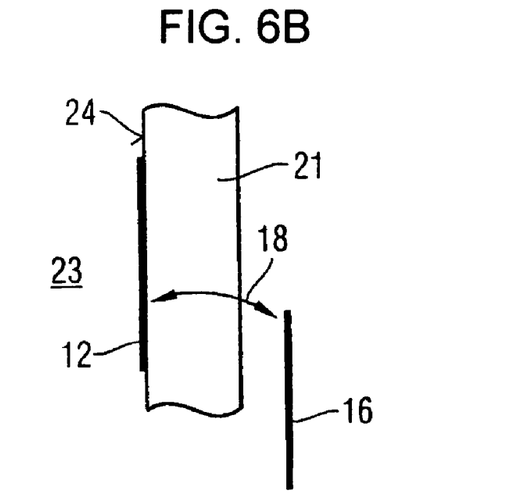

FIGS. 6A and 6B show two possible and preferred installation locations of the touch sensor 12. FIGS. 6A and 6B show a cross-section of a partial area of a window pane 21 in each case.

In the particularly preferred exemplary embodiment in FIG. 6A, the coil of the touch sensor 12 is arranged integrally in the window pane 21 and is therefore completely enveloped by the material of the window pane 21. Accordingly, it is impossible to contact the coil material of the touch sensor 12 directly from the exterior. In this case, the coil of the touch sensor 12 is merely inductively coupled to the coil element 16 of the electronic evaluation system, said coil element 16 being separate from the window pane 21. Consequently, upward and downward movement of the window pane 21 does not result in any mechanical wear of the coil of the touch sensor 12, thereby guaranteeing an extended service life and high reliability of the touch sensor 12 in this case.

In the exemplary embodiment in FIG. 6B, the coil of the touch sensor 12 is applied to a surface 24 of the window pane 21, said surface being oriented towards the interior 23 of the motor vehicle. The coil can be manufactured in a way which is very elegant and simple in manufacturing terms, e.g. by means of structured deposition or sputtering of conductive material onto the window pane 21 or even by means of adhesion. As a result of the coil of the touch element 12 being applied to the inner surface 24 of the pane 21, tampering from the exterior is again impossible.

Figure 7A:
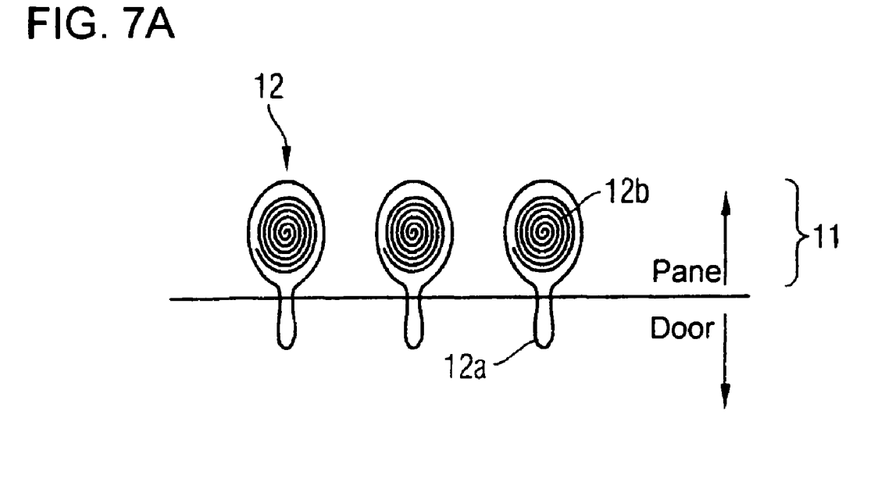
FIG. 7A-7C show various embodiments of the touch sensors of the security configuration according to the invention.
Figure 7B:
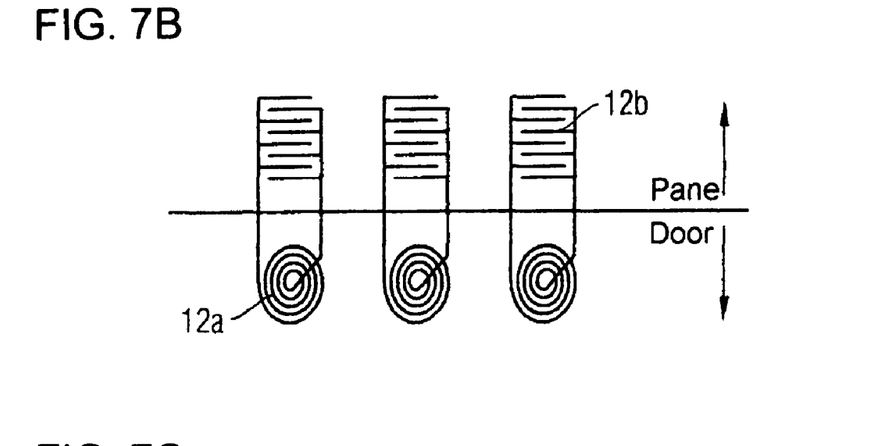
Figure 7C:
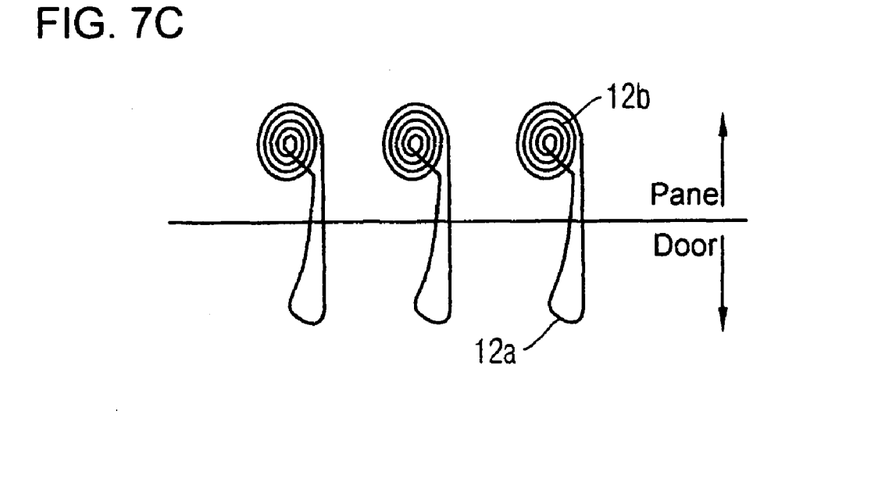

FIGS. 7A-7C schematically show three different embodiments for a touch sensor 12 of a keypad. In the exemplary embodiment in FIG. 7A, the coil of a touch sensor has a flat spiral structure with open coil ends as suggested previously in the FIGS. 1, 2, 4 and 5. Consequently, the inner spiral coil 12b is not electrically connected to the outer drawn-out winding 12a in this case. In the exemplary embodiment in FIG. 7B, the touch sensor 12 comprises a capacitive element of interdigital structure and a coil which is connected in parallel for simultaneous inductive coupling to the control device. In the exemplary embodiment in FIG. 7C, the coil of the touch sensor 12 is produced with closed ends and a winding 12a which is drawn out downwards for inductive coupling. In this case, therefore, the inner spiral coil 12b is electrically conductively connected to the outer winding 12a.

In all three exemplary embodiments of the FIGS. 7A-7C, the coil region 12b which is provided for picking up a touch or actuation is arranged in the externally visible region of the window pane 21, and the coil region 12a which is provided for the inductive coupling is arranged in the region of the window pane 21 which is screened by the bodywork of the door 20 and is therefore not visible.

The function of the inventive security configuration, and in particular the interaction of the keypad 11 with the electronic evaluation system 15, is described below:

The novel security configuration 10 according to the invention is configured so as to allow keyless access into a vehicle, e.g. a motor vehicle. In this case, provision is made for a code which can be input via the keypad 11 for the purpose of unlocking or locking the locking system of the motor vehicle. The input of the code is effected by actuating the keys 12 of the keypad 11 in a predetermined sequence corresponding to the code. A relevant touch sensor 12 is actuated, for example, by means of a finger pressure on the pane 21 in this case. As a result of this actuation, the variable capacity 14 of the touch sensor 12, which has the form of a resonant oscillating circuit, is changed and this is manifested in a changed resonance frequency. This change of the resonance frequency can be detected via a coil element 16 which acts as an inductive pick-up and is assigned to the respective touch sensor 12. The evaluation of the actuation which is detected by the touch sensor 12 is then coordinated by means of the control device 17 that is connected to the coil elements 16. The control device 17 is therefore able to capture an actuation of the individual touch sensors 12 and to establish a corresponding sequence. If the thus captured sequence of actuation of the various touch sensors 12 corresponds to the programmed sequence, the locking system is locked or unlocked accordingly.

Figure 8:
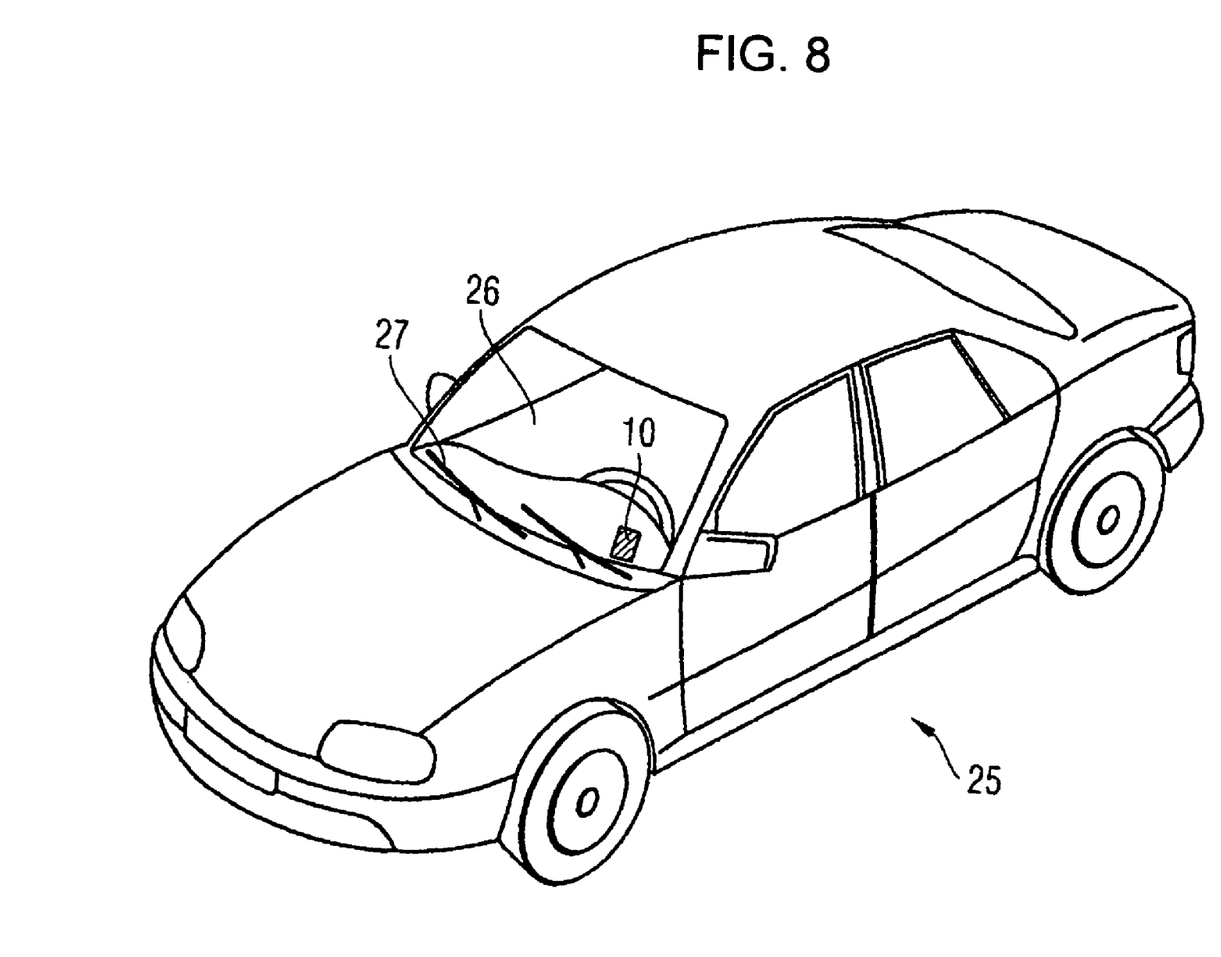
FIG. 8 shows a security configuration, in accordance with the invention, which is arranged in the region of the windshield pane of a motor vehicle.

FIG. 8 shows a further exemplary embodiment for a security configuration according to the invention. It illustrates a motor vehicle which is designated by the reference number 25, said motor vehicle 25 being illustrated in a perspective view from the front. The motor vehicle 25 features a windshield pane 26 and windshield wiper blades 27 of a windshield wiper system, these being are arranged on the outside of the windshield pane 26.

According to the invention, the keypad 11 of the security configuration 10 is now arranged on this windshield pane 26. The security configuration 10 is only indicated schematically here, but can correspond to the security configuration 10 in FIG. 8, for example. Here, for example, the keypad 11 can be arranged on the side at the edge of the windshield pane 26 in the region which is wiped by the windshield wiper blade 27. In this way, in addition to an access authorization request, the inventive security configuration 10 which features a keypad 11 and an electronic evaluation system 15 can also detect rainwater falling onto the windshield pane 26. In this way, the inventive security configuration can be used concurrently as a rain sensor for detecting rain, thereby allowing the windshield wipers 27 or the wiper speed to be controlled automatically. By virtue of the dual function of a security configuration 10 according to the invention, as access authorization unit and concurrently as rain sensor, a particular cost advantage is produced since it is possible here to dispense with a unit which is provided solely as a rain sensor or as an access authorization unit.

Although the present invention is described with reference to a preferred exemplary embodiment in the foregoing, it is not restricted to this but can be modified in a multiplicity of ways.

Hence, in particular, the invention is not limited to the specified number of touch sensors used within a keypad or the corresponding inductive pick-ups of the electronic evaluation system. Rather, the number of these elements can be varied as required and in particular adapted to the codes that are planned for input. The number of touch sensors that are used depends in particular on the level of encryption which is to be input via the keys.

Furthermore, the individual touch sensors need not necessarily have the structure specified in the exemplary embodiments or the form thereof. Rather, the form of the coils of the touch sensors can also be altered or modified as required, provided a variation of a resonance frequency can be detected using said coils. Similarly, the touch sensors need not be arranged specifically in the region of the window pane as illustrated in FIGS. 4 and 6, but can be arranged at any position on the surface or within the window pane and, in particular, at any position of the window pane in relation to the bodywork, without requiring inventive skill on the part of a person skilled in the art.

In the present exemplary embodiment, the resonant oscillating circuit takes the form of a parallel connection. It is obvious that a resonant oscillating circuit which is produced at least partially as a simple oscillating circuit would also be conceivable here.

The invention claimed is:

1. A security configuration in or for a vehicle having a bodywork part and a window pane disposed in the bodywork part, the security configuration comprising:
   a touch-sensitive keypad disposed in or mounted on the window pane, said keypad including a plurality of touch sensors each in the form of a resonant oscillating circuit and capable of acquiring an actuation of a respective said touch sensor; and
   an electronic evaluation system configured and disposed to detect an actuation of said keypad and to attribute each actuation to a respectively actuated said touch sensor, said electronic evaluation system including at least one coil element;
   at least one of said touch sensors including a passive coil region inductively coupled to said coil element at least when said one of said touch sensors is actuated; and
   said one of said touch sensors being unpowered.

2. The security configuration according to claim 1, wherein said electronic evaluation system is inductively coupled to said keypad.

3. The security configuration according to claim 1, wherein at least one of said touch sensors of said keypad has an inductive part, and said electronic evaluation system includes an inductive pick-up inductively coupled to said inductive part of said touch sensor.

4. The security configuration according to claim 1, wherein said passive coil region includes a drawn-out winding disposed for inductively coupling said one of said touch sensors to said coil element of said electronic evaluation system.

5. The security configuration according to claim 1, wherein said keypad is disposed at least partially in an externally visible region of the window pane and/or a region of said touch sensors that is inductively coupled to said electronic evaluation system is disposed in a region of the window pane that is not externally visible.

6. The security configuration according to claim 1, wherein individual said touch sensors are disposed integrally within a material of the window pane.

7. The security configuration according to claim 1, wherein individual said touch sensors are applied on a surface of the window pane.

8. The security configuration according to claim 7, wherein said touch sensors are mounted to a surface of the window pane oriented toward an interior of a passenger compartment of the vehicle.

9. The security configuration according to claim 1, wherein the bodywork part is a vehicle door and the window pane is disposed to be at least partially retractable into the vehicle door.

10. The security configuration according to claim 9, wherein said electronic evaluation system is mounted at a fixed location within the vehicle door.

11. The security configuration according to claim 1, wherein said electronic evaluation system includes a program-controlled unit for evaluation, said program controlled unit forming a part of a control device of the security configuration.

12. The security configuration according to claim 11, wherein said program-controlled unit is a microcontroller or a microprocessor.

13. The security configuration according to claim 1, wherein at least one of said touch sensors includes a variable capacitive part and an inductive part connected in parallel with each other.

14. The security configuration according to claim 1, wherein at least one of said touch sensors has a spiral coil.

15. In combination with a motor vehicle, at least one security configuration according to claim 1 installed in the motor vehicle.

16. The motor vehicle according to claim 15, wherein the bodywork part is a driver-side vehicle door.

17. The motor vehicle according to claim 15, wherein the security configuration is a component part of an access authorization system and/or an ignition authorization system.

18. The motor vehicle according to claim 15, wherein the window pane is a windshield pane of the motor vehicle and/or a rear window pane of the motor vehicle.

19. The motor vehicle according to claim 18, wherein the motor vehicle is provided with a rain sensor for detecting rain falling on the windshield pane and/or the rear window pane, and said rain sensor forms a component part of the security configuration.

20. The motor vehicle according to claim 19, wherein the electronic evaluation system controls a wiper speed of a windshield wiper of the motor vehicle depending on an amount of rain detected by said rain sensor unit.

* * * * *